Oct. 6, 1931.  E. E. HANS  1,826,397
DUPLEX PRESSURE GAUGE
Filed May 7, 1928

Inventor
Edmund E. Hans

By Blackmore, Spencer & Hunt
Attorneys

Patented Oct. 6, 1931

1,826,397

UNITED STATES PATENT OFFICE

EDMUND E. HANS, OF DETROIT, MICHIGAN, ASSIGNOR TO A C SPARK PLUG COMPANY, OF FLINT, MICHIGAN, A COMPANY OF MICHIGAN

DUPLEX PRESSURE GAUGE

Application filed May 7, 1928. Serial No. 275,726.

This invention relates to pressure gauges of the duplex type and has particular reference to the type of gauges using Bourdon tubes.

The object of the invention is to provide a gauge which will be no deeper than the conventional gauge, but one which will be capable of registering pressures independently from a plurality of points or sources.

The object of the invention is accomplished by mounting in the same plane in a single casing two Bourdon tubes which overlap each other, and which operate independent pointers swinging on the same axis. The entire mechanism is mounted on a base plate which rests in the bottom of the gauge.

Each Bourdon tube has associated therewith a separate and independent pointer operating mechanism, however, the mechanism of one pointer is supplied with additional means which will permit its movement being communicated to a pointer which is mounted coaxially with the pointer of the second swinging mechanism.

By the use of the invention, I am able to construct a gauge which will be of substantially the same depth of an ordinary gauge, and of a width which is somewhat broader than a single gauge but is considerably less than the combined width of two gauges.

Due to the overlapping of the Bourdon tubes, I am able to produce a gauge which is of a size considerably less than two single gauges, and instead of having gauge mechanisms one above the other, as in the existing type of duplex gauges, I place the mechanisms in the same plane and so spaced from each other that they are easily accessible for repair.

Figure 2:
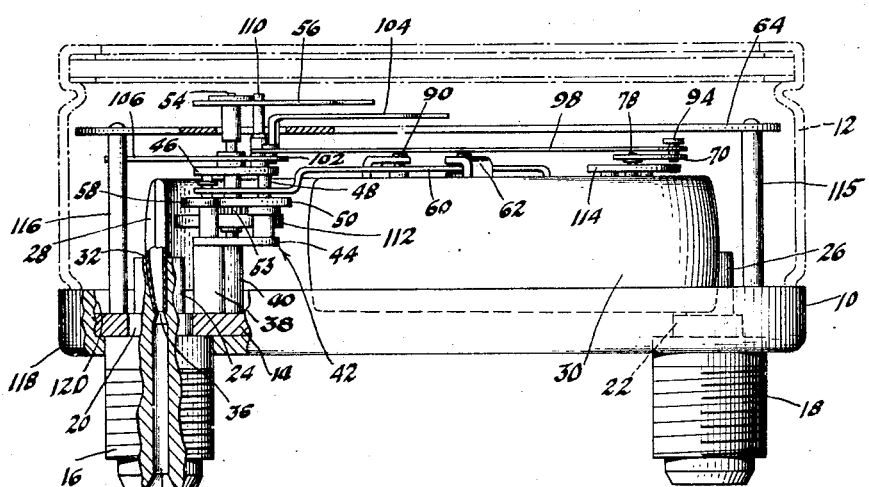
Figure 2 is a side view of the structure shown in Figure 1, with parts broken away and in section for purposes of clearer illustration.

Referring to the numbered parts on the drawings, the numeral 10 indicates the gauge as a whole, and 12 the casing thereof, shown in dotted outline in Figure 2.

Figure 1:
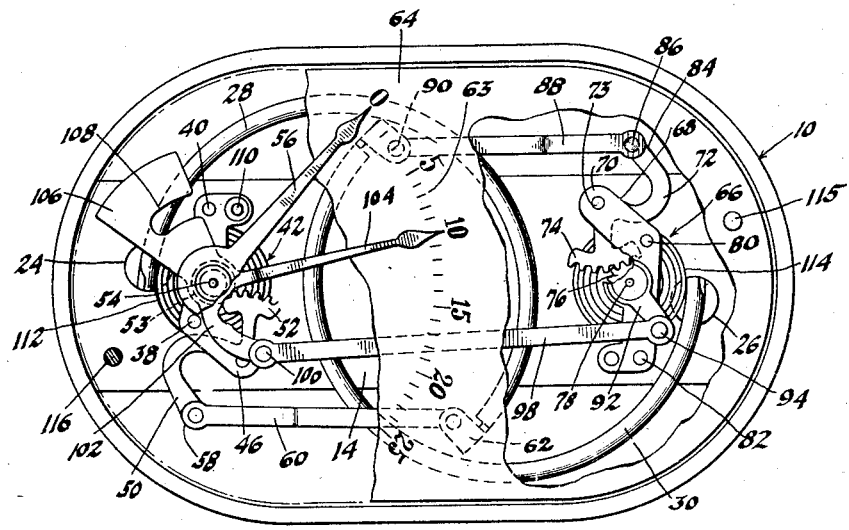
Figure 1 shows a plan view of the gauge with portions of the dial broken away to better illustrate the construction.

The gauge mechanism is mounted on a base plate 14, which in practice is preferably of a width somewhat less than the width of the gauge as is seen from Figure 1, however, if desired, the plate 14 may occupy the entire bottom portion of the gauge.

Mounted on the base plate 10 is a plurality of inlet studs or sockets 16 and 18, which have reduced portions 20 and 22 provided with projections 24 and 26 extending into the gauge and to which are attached the Bourdon tubes 28 and 30 respectively. These projections extend but a relatively short distance beyond the inner plane of the base plate 10, as is seen in Figure 2. This construction is in contradistinction to existing practice in which the projecting portions 24 and 26 have extended substantially the entire width of the Bourdon tubes.

The Bourdon tubes 28 and 30 are positioned in slots 32 in the projections 24 or 26, and are soldered or brazed therein. These Bourdon tubes are attached before the inlet studs or sockets are finally drilled to provide the through bore 34. This bore 34 extends short of the Bourdon tube and has a reduced portion 36 affording communication between the bore 34 and inner portion of the tube 28 or 30. The reduced bore 36 is drilled after the Bourdon tube is secured in the projections 24 or 26.

By referring to Figure 1, it will be noted that the Bourdon tubes 28 or 30 overlap each other, the end of one extending well within the arcuate portion of the other. This method of interrelating the Bourdon tubes allows of a very compact construction, and at the same time prevents the interference of one tube with the action of the other.

Mounted in the base frame 14 at the left thereof when referring to the drawings preferably on a pair of pillars 38 and 40 is a pointer swinging mechanism indicated as a whole at 42. This mechanism includes the frame composed of the plates 44 and 46 between which there are pivoted the various parts of the mechanism. Journally mounted between the plates 44 and 46 is a shaft 48 which has rigidly mounted thereon a sector member 50, the toothed portion 52 of which meshes with a toothed wheel 53, rigid with a shaft 54, to the upper end of which there is rigidly secured the pointer 56. The opposite end 58 of the sector 50 is connected by means of a link 60 to the end 62 of the Bourdon tube 28. It will therefore, be obvious, that when pressure is applied through the inlet stud 16, the Bourdon tube 28 will tend to straighten and communicate its motion by means of a link 60, the sector 50, pinion 52 and shaft 54, to the pointer 56. The position of the pointer on the scale 63 of the dial 64 will indicate the amount of pressure within the tube 28.

At the opposite end of the base plate 14 and interrelated with the Bourdon tube 30 is a second pointer swinging mechanism indicated as a whole at 66. This mechanism comprises the frame 68 composed of the individual plates 70, which have pivoted therebetween as at 73 the sector member 72, having the rack portion 74 meshing with a pinion 76 rigid with a shaft 78 journalled in the frame 68. The frame 68 is mounted on pillars 80 and 82, which are attached to the base plate 14. The opposite end 84 of the sector member 72 has pivoted thereto as at 86, a link 88 connected at its opposite end as at 90 to the end of the Bourdon tube 30.

The upper end of the shaft 78 has rigidly attached thereto an arm 92 to the free end of which there is pivoted, as at 94 a link 98, the opposite end 100 of which is pivoted to an arm 102 formed integral with a pointer 104. The pointer 104 is further provided with a counterweight 106, which has a slot 108 to permit it to pass the stop pin 110. The pointer 104 is pivotally or journally mounted on the shaft 54 and is adapted to rotate freely thereon.

Both pointer swinging mechanisms have operatively connected thereto, the hairsprings 112 and 114, the purpose of which is to return the mechanisms to their zero positions.

The operation of the Bourdon tube 30 and the mechanism 66 connected therewith is as follows: When the pressure is transmitted through the bore 34 of the inlet stud or socket 18, this pressure will be communicated to the Bourdon tube 30, which will tend to straighten in response to the pressure, and thereby cause a pull on the link 88. This pull will be transmitted through the sector 72, pivoted at 73, to the toothed portion 74, which will cause a rotation of the pinion 76 and shaft 78 secured thereto. The movement of the shaft 78 will swing the arm 92, which will cause the link 98 to swing the arm 102. The arm 102 is journalled on the shaft 54, and has integral therewith the pointer 104. The movement of the arm 102 will thereby produce a corresponding movement of the pointer 104, and its position on the dial will determine the extent of pressure within the Bourdon tube 30.

From the description of the operation of the Bourdon tube 30 and its mechanism 66, the operation of the Bourdon tube 28 and its mechanism 42 will be understood for the reason that they are substantially similar. The distinction in the two lies in the omission from the mechanism 42 of the link 98, and the replacing of the arm 92 by the pointer 56. Inasmuch as the shaft 54 and the arm 102 and pointer 104 are capable of relative rotation, it will be apparent that the operation of one Bourdon tube and its mechanism will be entirely independent of and have no effect on the operation of the second Bourdon tube and its mechanism.

The dial 64 is preferably supported by means of posts 115 and 116 at suitable points on the base plate 14.

The base plate 14 is preferably mounted in a bottom portion 118, which forms the back of the gauge and which may be suitably shaped to conform to the space occupied by the gauge mechanisms. This bottom portion 118 has the upwardly extending flange 120 to which the casing 12 is attached.

I claim:

1. In a gauge, a base plate, a plurality of studs mounted on said plate, a mounting frame on said plate adjacent each stud, pointer operating mechanism mounted on each of said frames, a pressure responsive member mounted on each of said studs, means interconnecting each pressure responsive member to a corresponding pointer operating mechanism, and pointers swinging on a common axis and operated by each of said mechanisms.

2. In a gauge, a base plate, a plurality of studs mounted in said plate, a plurality of pressure responsive members mounted on said studs, a pointer operating mechanism adjacent each stud, means connecting each pressure responsive member to a pointer operating mechanism, a plurality of pointers at one of said operating mechanisms, and means connecting each mechanism with one pointer.

3. In a gauge, a base plate, a plurality of studs mounted on said plate, a plurality of pressure responsive members mounted on said studs, a pointer operating mechanism adjacent one of said studs including a shaft, a pointer rigid with said shaft, means connecting one of said members to said mechanism, a second pointer operating mechanism mounted adjacent another of said studs and operatively connected to a second member, a second pointer loosely mounted on said shaft, and means connecting said second mechanism and said second pointer.

4. In a gauge, a base plate, a plurality of studs mounted on said plate, a mounting frame on said plate adjacent each stud, pointer operating mechanism mounted on each of said frames, pressure responsive members mounted in overlapping relation on said studs, means interconnecting each pressure responsive member to a pointer operating mechanism, and pointers swinging on a common axis and operated by each of said mechanisms.

5. In a gauge, a base plate, a plurality of studs mounted on said plate, a plurality of pressure responsive members mounted on said studs, a pointer operating mechanism adjacent one of said studs including a shaft, a pointer rigid with said shaft, means connecting one of said members to said mechanism, a second pointer operating mechanism mounted adjacent another of said studs and operatively connected to a second member, a second pointer loosely mounted on said shaft, and a link and an arm on said second pointer connecting said second mechanism and said second pointer.

In testimony whereof I affix my signature.

EDMUND E. HANS.